May 28, 1968  H. LANGE  3,385,463

ALKALI METAL VAPOR LAMP

Filed Feb. 24, 1966

WITNESSES
Theodore F. Wrobel
James F. Young

INVENTOR
Horst Lange
BY
W. D. Palmer
ATTORNEY

United States Patent Office 3,385,463
Patented May 28, 1968

3,385,463
ALKALI METAL VAPOR LAMP
Horst Lange, Berlin, Germany, assignor to Patent-Treuhand-Gesellschaft für Elektrische Gluhlampen m.b.H., Munich, Germany
Filed Feb. 24, 1966, Ser. No. 529,792
Claims priority, application Germany, Mar. 11, 1965, P 36,261
7 Claims. (Cl. 220—2.3)

ABSTRACT OF THE DISCLOSURE

An alkali metal vapor lamp having an envelope of light-transmissive, sintered, aluminum oxide, closed at its ends by electrode and lead-in conductor carrying metallic end caps, preferably of niobium. The end caps are sealed to the aluminum oxide envelope by interposing therebetween a sealing composition composed of at least 90% by weight of aluminum oxide and not more than 10% by weight of one or more other metallic oxides selected from the group comprising magnesium oxide, beryllium oxide, calcium oxide, strontium oxide, barium oxide and gallium oxide. The associated envelope, sealing composition and end caps are subjected to a temperature of 1900° C. for from 1 to 2 minutes to produce a homogeneous, mechanically and thermically stable seal between the end caps and the envelope.

---

Figure 1A:
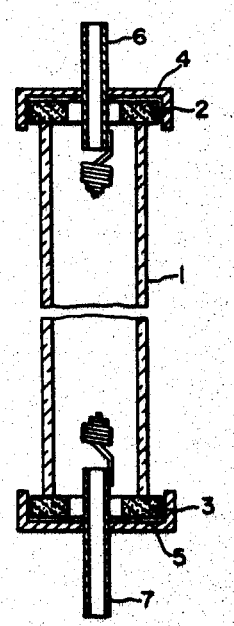

This invention relates to electric lamps, and more particularly to alkali metal vapor lamps, having an envelope of transparent, sintered aluminum oxide, each end of which is sealed vacuum tight with an end closure member. The end closure member may consist of a ceramic or metal disk or cap which is sealed directly with the envelope end by means of a ceramic sealing composition composed of aluminum oxide and one or more of several metal oxides.

When lamp envelopes of ceramic material are used some difficulty arises with respect to the vacuum tight sealing of the lamp envelope and with respect to the vacuum tight sealing of lead-in conductors because of the differing coefficients of thermal expansion of the materials which generally consist of ceramic and metal parts. When ceramic lamp envelopes are used in alkali metal vapor lamps, for example, sodium lamps, which are operated at relatively high temperatures, care must be taken that the end closure members have good resistance to chemically aggressive, hot alkali metal vapors.

Several methods have been employed for bonding ceramic lamp envelopes to metal or ceramic end caps. It is, for instance, well known to solder ceramic parts together with metal parts, by means of hard or soft solder. Such soldering process, however, requires complicated pre-treatment of the ceramic sruface. In one of these methods, for instance, titanium hydride is applied to the surface of the ceramic and is decomposed for the purpose of forming a titanium layer to which the metal part is soldered with silver solder. In another method manganese-molybdenum powder is fired on the surface of the ceramic and a nickel or copper layer is then employed to solder the metallic end cap to the ceramic body. As is apparent, several steps are required in providing the above-described types of bonds. There is, however, a single step method in which a thin titanium closure member is sealed onto the ends of a ceramic envelope of aluminum oxide by employing an iron-cobalt-nickel alloy as a sealing means. Bonding of the parts is then accomplished by pressing them together and heating them in a well known oxidizing atmosphere to a temperature of between 950° C. and 1060° C. Such bonds, however, are not suitable for higher temperature stresses.

Sealing glasses have also been employed for bonding aluminum oxide ceramic envelopes to metallic end caps of metals such as, for example, niobium. An example of such a glossy sealing material is, for instance, a composition consisting of 38% by weight of aluminum oxide, 42% by weight of calcium oxide, 7% by weight of silicon dioxide, 8% by weight of magnesium oxide and 5% or less by weight of one or more oxides of stronium oxide, beryllium oxide, zirconium oxide and boron oxide. Such glasses, however, recrystallize at higher temperatures causing cracks to occur resulting in undesired leakage. Furthermore, when such glassy sealing materials are used in alkali metal vapor lamps an undesirable reaction occurs between the sealing material and the hot alkali vapors.

Ceramic closure members have also been employed instead of closure members of niobium or other metals. Such ceramic end closure members generally principally consist of at least two metallic oxides such as, for example, a substantial amount of aluminum oxide in addition to calcium oxide and/or barium or strontium oxide at nearly eutectic percentages. The glassy sealing material is applied in powdered form to the surfaces to be bonded, the treated surfaces are placed together and heated to a temperature which lies above the lowest eutectic temperature of the metallic oxides contained in the glassy sealing material, for example, approximately 1400° C. It follows therefore that the maximum temperatures which the sealing material can withstand is much less than that of the aluminum oxide envelope.

Bonds have also been made between ceramic discharge envelopes and ceramic closure members by means of an intermediate layer of the same material as that of the parts to be bonded. The difficulty here lies in that the preparation of the intermediate layer takes the same form as the preparation of the aluminum oxide envelope itself. This means that bonding times correspond to the technically undesirable length of times required in preparing a ceramic envelope. Additionally, such high bonding temperatures are required that deformation of the lamp envelope often occurs and fissures may be created as a consequence of the low resistance to the thermal stresses occurring in the envelope at these high temperatures. It is even more difficult to bond a metallic closure member to an aluminum oxide ceramic envelope by means of this method.

It is accordingly an object of the present invention to provide an alkali metal vapor lamp employing a homogeneous, mechanically and thermally stable seal.

Another object of the present invention is to provide an alkali metal vapor lamp employing a sealing composition having an eutectic point above 1700° C.

A further object of this invention is the provision of an alkali metal vapor lamp employing a sealing composition, the components of which form a crystalline solid solution melting at more than 1500° C.

Still another object of this invention is to provide an alkali metal vapor lamp employing a sealing composition which exhibits a coefficient of thermal expansion which differs by no more than 20% from that of the aluminum oxide lamp envelope.

Many of the above enumerated drawbacks are eliminated and the foregoing objects accomplished in the lamp of the present invention which includes an envelope of light-transmissive, sintered, aluminum oxide and a pair of end closure members of ceramic or metal by providing a homogeneous, mechanically and thermally stable bond between the envelope and the end closure member by employing a ceramic sealing composition having a lower melting point than the envelope material and composed of more than 90% by weight of aluminum oxide so that the composition has a eutectic point above 1700° C. Alternatively, the components may form a crystalline solid solution melting at more than 1500° C. The composition is chosen in such a manner that its coefficient of thermal expansion differs by not more than 20% from that of the envelope material.

Figure 1B:
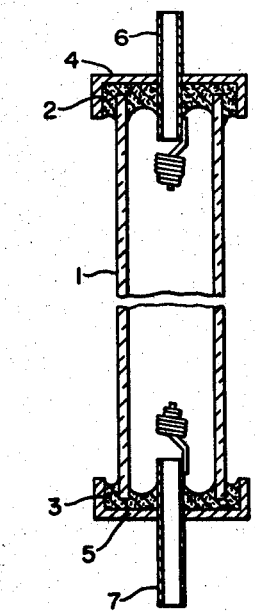

The exact nature of this invention, as well as other objects and advantages thereof, will be readily apparent from consideration of the following detailed description relating in part to the accompanying drawing, in which:

FIGURE 1a is a sectional view of a lamp constructed in accordance with the present invention prior to bonding; and FIG. 1b is a sectional view of a lamp constructed in accordance with the present invention after bonding has occurred.

It has been found that ceramics consisting of more than 90% by weight of aluminum oxide and additions of metal oxides of less than 10% by weight do not differ to any great extent in their properties from those of ceramics of pure aluminum oxide. Ceramics containing metal oxide additions of less than 10% have nearly the same structure as pure aluminum oxide, have no glassy components and evidence a coefficient of thermal expansion which differs from pure aluminum oxide only slightly and nearly proportionally to the added quantity. Such ceramics are quite suitable for use in the bonding of alkali metal vapor lamp parts because they are resistant to alkali metal vapor and exhibit a melting point only slightly different from pure aluminum oxide by virtue of the minor additions of other metal oxides. In the past, in order to obtain a sufficient melting point decrease, the other properties of the sealing composition have been considerably altered with respect to those of pure aluminum oxide, especially with regard to the coefficient of thermal expansion and, accordingly, such seals would often be destroyed by high temperature stresses in the lamp.

The present invention provides a simple solution for a reliable end closure seal of an alkali metal vapor lamp through the addition of only such metal oxides which have a melting temperature range below the melting point of the aluminum oxide ceramic but a eutectic point with the aluminum oxide in excess of 1700° C. According to the invention, it has been found that an addition of magnesium oxide below 5% by weight, preferably 2% by weight, to pure aluminum oxide brings about a melting point decrease of more than 100° C. with the eutectic point between the aluminum oxide and magnesium oxide being about 1925° C., in the phase diagram. A similar favorable behavior is evident in a composition consisting of an addition of beryllium oxide of less than 10% by weight, preferably 7% by weight, to pure aluminum oxide. The attained decrease in melting point of this composition is approximately 200° C. and although it is a greater decrease than that provided by the magnesium oxide, it is still far less than that with additions known hitherto.

As a specific example, a ceramic disk with the above mentioned composition of 98% by weight of aluminum oxide and 2% by weight of magnesium oxide has been employed to seal vacuum tight, in a few minutes, an envelope of transparent sintered corundum to niobium end caps. It has been further found that such a seal provides a microscopic crystalline structure which is perfectly homogeneous in the transition zones.

Seals have also been successfully accomplished employing small amounts, up to 2% of materials taken from the group consisting of calcium oxide, strontium oxide and barium oxide in place of the magnesium oxide.

Satisfactory seals have also been accomplished by employing a crystalline solid solution composed of gallium oxide and aluminum oxide. This crystalline solid solution as previously described is composed of not less than 90% by weight of aluminum oxide and not more than 10% by weight of gallium oxide and has a melting point in excess of 1500° C. Owing to the fact that the ion radii of the gallium oxide and aluminum oxide differ only by about 10% the coefficient of expansion does not differ significantly in the crystalline solid solution region.

Referring now more particularly to the drawing, FIGS. 1a and 1b show schematically a specific embodiment of a lamp envelope which is bonded to a closure member in accordance with the present invention. FIG. 1a shows the lamp before bonding and FIG. 1b after bonding. The lamp envelope 1 consists of transparent sintered aluminum oxide and is provided at each end with an annular disk 2 and 3, respectively, of 98% by weight of aluminum oxide and 2% by weight of magnesium oxide. The density of the disks amount to about 98% of the theoretical. The disks 2 and 3 are bonded on one side to the ends of envelope 1 and on their other side to metallic end cap 4 and 5, respectively, of niobium which are provided with a central aperture. Current in-leads 6 and 7, respectively, pass vacuum tight through the central apertures and niobium end caps 4 and 5.

The above-described bonding as shown in FIG. 1b between the aluminum oxide envelope 1, the sealing composition 2 and 3, and the end caps 4 and 5 will occur when the embodiment shown in FIG. 1a is subjected to a temperature of 1900° C. for from one to two minutes.

The advantage of bonding within a short time and in one single working step are quite obvious. Since only small additions are employed there are scarcely any changes in ceramic structure, properties are maintained except for the melting point decrease so that the points of bonding are reliable with high and variable temperature stresses. Seals according to the present invention may therefore be used in all such cases where temperature stresses occur as, for example, in metal halide discharge lamps, and since there is no reaction between the ceramic sealing composition and the alkali metal vapors the seal proves quite suitable for alkali metal vapor lamps and represents a reliable and durable seal.

What is claimed is:

1. An alkali metal vapor lamp comprising: (a) a light-transmitting sintered aluminum oxide envelope, (b) a closure member closing each end of said envelope and (c) sealing means interposed between said closure member and its associated end of said envelope for obtaining a homogeneous, mechanically and thermically stable seal; said sealing means comprising a composition composed of at least 90% by weight of aluminum oxide and not more than 10% by weight of one or more other metal oxides and having a eutectic point above 1700° C.

2. An alkali metal vapor lamp according to claim 1 wherein said sealing composition is composed of aluminum oxide and magnesium oxide.

3. An alkali metal vapor lamp according to claim 2 wherein said magnesium oxide comprises less than 5% by weight of said composition.

4. An alkali metal vapor lamp according to claim 1 wherein said sealing composition is composed of aluminum oxide and beryllium oxide.

5. An alkali metal vapor lamp according to claim 4 wherein said beryllium oxide content amounts to 7% by weight.

6. An alkali metal vapor lamp comprising: (a) a light-transmitting sintered aluminum oxide envelope; (b) a closure member closing each end of said envelope; and (c) sealing means interposed between said closure members and each end of said envelope for obtaining a homogeneous, mechanically and thermically stable seal, said sealing means comprising a composition composed of at least 90% by weight of aluminum oxide and not more than 10% by weight of one or more other metal oxides, said aluminum oxide and said metal oxides forming a crystalline solid solution having a melting point in excess of 1500° C. and a coefficient of thermal expansion differing by not more than 20% from that of said envelope.

7. An alkali metal vapor lamp according to claim 6 wherein said composition includes less than 10% by weight of gallium oxide.

References Cited

UNITED STATES PATENTS

| | | | |
|---|---|---|---|
| 3,036,675 | 5/1962 | Benichou | 220—2.3 X |
| 3,171,519 | 3/1965 | Nolte | 287—189.365 |
| 3,275,359 | 9/1966 | Graff | 287—189.365 |
| 3,302,961 | 2/1967 | Franklin | 287—189.365 |

MARTHA L. RICE, *Primary Examiner.*